United States Patent [19]

Ellwood et al.

[11] 4,004,787
[45] Jan. 25, 1977

[54] MIXING AND VENTING EXTRUDER

[75] Inventors: Henry Ellwood; Maurice Rothwell, both of Greater Manchester, England

[73] Assignee: USM Corporation, Boston, Mass.

[22] Filed: Jan. 8, 1976

[21] Appl. No.: 647,511

[30] Foreign Application Priority Data

Jan. 10, 1975 United Kingdom ............ 1037/75
May 9, 1975 United Kingdom ............ 19527/75

[52] U.S. Cl. ............................................ 259/192
[51] Int. Cl.² ................ B29B 1/10; B01F 7/08; B01F 15/02
[58] Field of Search ............ 259/9, 10, 6, 191, 192, 259/193; 159/2 E; 425/190, 191, 192, 203, 204, 208, 216

[56] References Cited

UNITED STATES PATENTS

| 3,239,878 | 3/1966 | Ahlefeld et al. | 259/192 |
| 3,666,386 | 5/1972 | McElroy et al. | 259/191 |
| 3,811,658 | 5/1974 | Heidrich | 259/191 |

*Primary Examiner*—Harvey C. Hornsby
*Assistant Examiner*—Alan Cantor
*Attorney, Agent, or Firm*—Richard B. Megley; Vincent A. White; Donald N. Halgren

[57] ABSTRACT

An extrusion apparatus for use with thermoplastic materials has a withdrawable rotor which is mounted on a piston motivated carriage, the carriage having anti-vibration mounting members to reduce loads on the rotor. A gaseous vent chamber is operable in conjunction with a reversible extruder screw and a waste mix ejection arrangement, to prevent undesirable contamination or incompletely mixed material from the extruded product.

4 Claims, 3 Drawing Figures

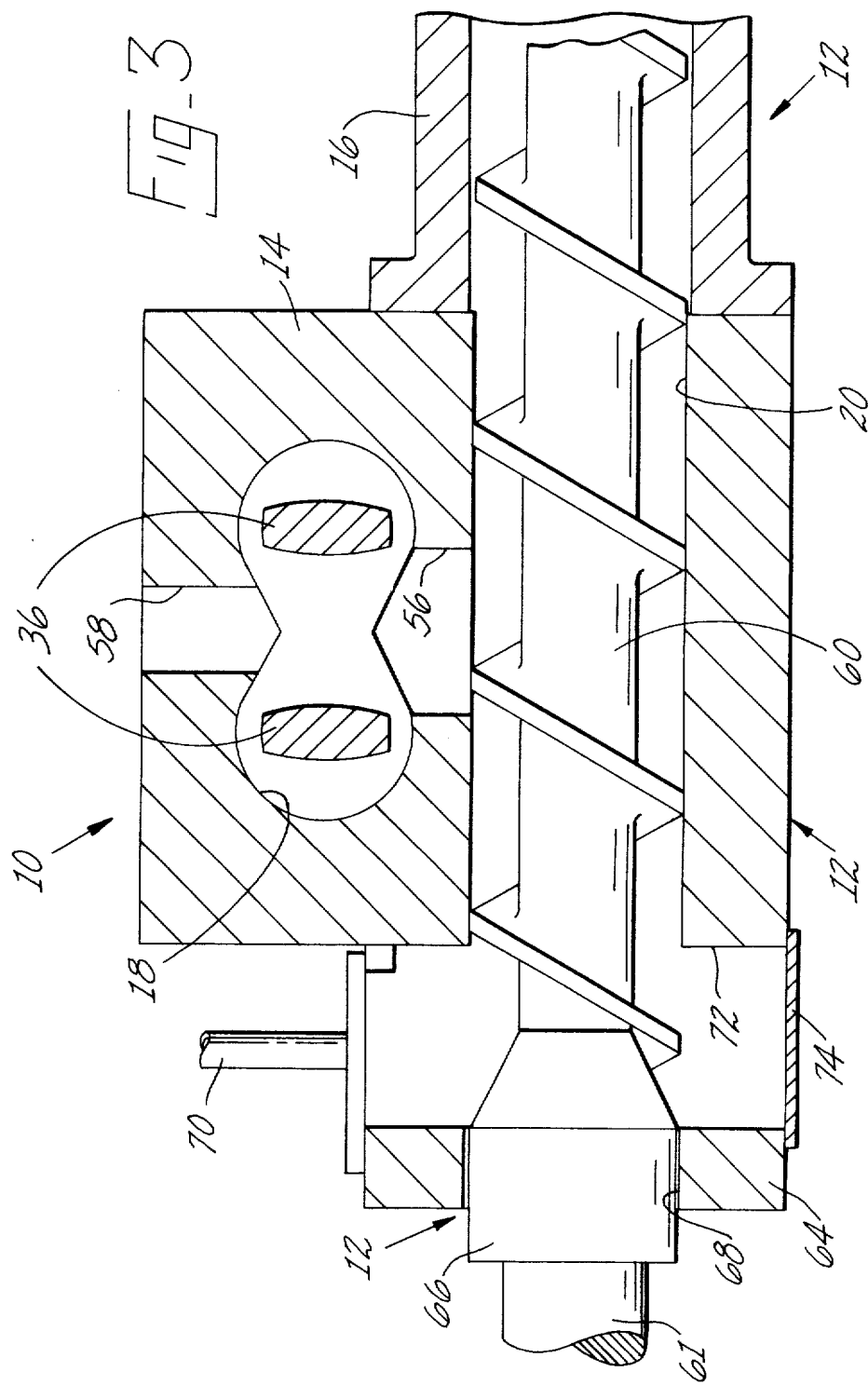

MIXING AND VENTING EXTRUDER

BACKGROUND OF THE INVENTION

1. Field of the Invention

This invention is related to extrusion apparatus for processing rubber or plastic material.

2. Prior Art

Recent examples of prior art extruders include U.S. Pat. No. 3,154,808 assigned to the assignee of the present invention and U.S. Pat. Nos. 3,865,355 and 3,869,111. The '355 patent describes an extruder having an auger feed tube attached to the side of its hopper where additives may be entered into the mix. The '111 patent discloses an extruding machine having rotor members with axially accentuated blade portions.

SUMMARY OF THE INVENTION

The present invention provides a novel and continuous, improved closed chamber apparatus for mixing and/or compounding rubber, elastomer, plastics and like mixes.

The invention comprises a barrel having an elongated bore therein, a rotor in the bore to process material fed to the bore, and a carriage on which the rotor is mounted for rotation, the carriage being mounted for movement toward and away from the barrel wherein movement of the carriage away from the barrel withdraws the rotor from the bore.

The apparatus comprises a piston and cylinder device, for moving the carriage. The carriage comprises anti-vibration mounting which permits minimization of any load on the rotor. The drive means for rotating the rotor in the bore of the barrel, is also mounted on the carriage. The carriage preferably runs on rails during said movement toward and away from the barrel.

The apparatus may comprise one or more rotors. The bore may have a cross section approximately of a figure eight and two rotors with parallel axes which may be received one in each part of the bore, the rotors having blades in a configuration generally similar to that of the rotors of an internal mixer, e.g., a "Banbury" mixer.

The invention also includes an extruder comprising an inlet through which material to be extruded can be introduced into the bore at a rear, and an outlet leading from the bore at a front. An extruder screw is mounted for rotation in the bore with the rotor projecting rearwardly beyond the inlet.

In the operation of the extruder a conduit is provided permitting passage of gas, but not material to be extruded, rearwardly along the bore. A vacuum connection to the bore is provided rearwardly of the inlet, so that suction applied to the vacuum connection withdraws gaseous matter along the conduit from the bore while material is extruded.

The extruder screw extends from a portion of the bore in front of the inlet rearwardly beyond the inlet to the rear of the bore, the thread of the screw in this instance providing the said conduit permitting passage of gas. The vacuum connection may comprise a sealing member disposed over the rear end of the bore and sealed to the barrel, the sealing member having means for connecting a suction pipe thereto for applying suction to the rear of the bore.

The invention further provides a primary outlet leading from the bore at a front end portion of the barrel and a secondary outlet leading from the bore at the rear end portion of the barrel rearwardly of the inlet. An extrusion screw extends along the bore at least from the secondary outlet to forwardly of the inlet. Drive means rotates the rotor in the bore in the operation of the extruder. The drive means is operable to rotate the rotor in a first direction to cause its screw portion to feed material supplied through the inlet forwardly along the bore and out of the primary outlet, or in a second direction opposite to the first direction to cause the screw portion to feed material supplied through the inlet rearwardly along the bore and out of the secondary outlet.

BRIEF DESCRIPTION OF THE DRAWINGS

The objects and advantages of the present invention will become more apparent when viewed with the accompanying drawings in which:

FIG. 3 is a diagrammatic view in cross section showing a rear end portion of an extruder portion of the illustrative extruder.

DESCRIPTION OF THE PREFERRED EMBODIMENT

Figure 1:
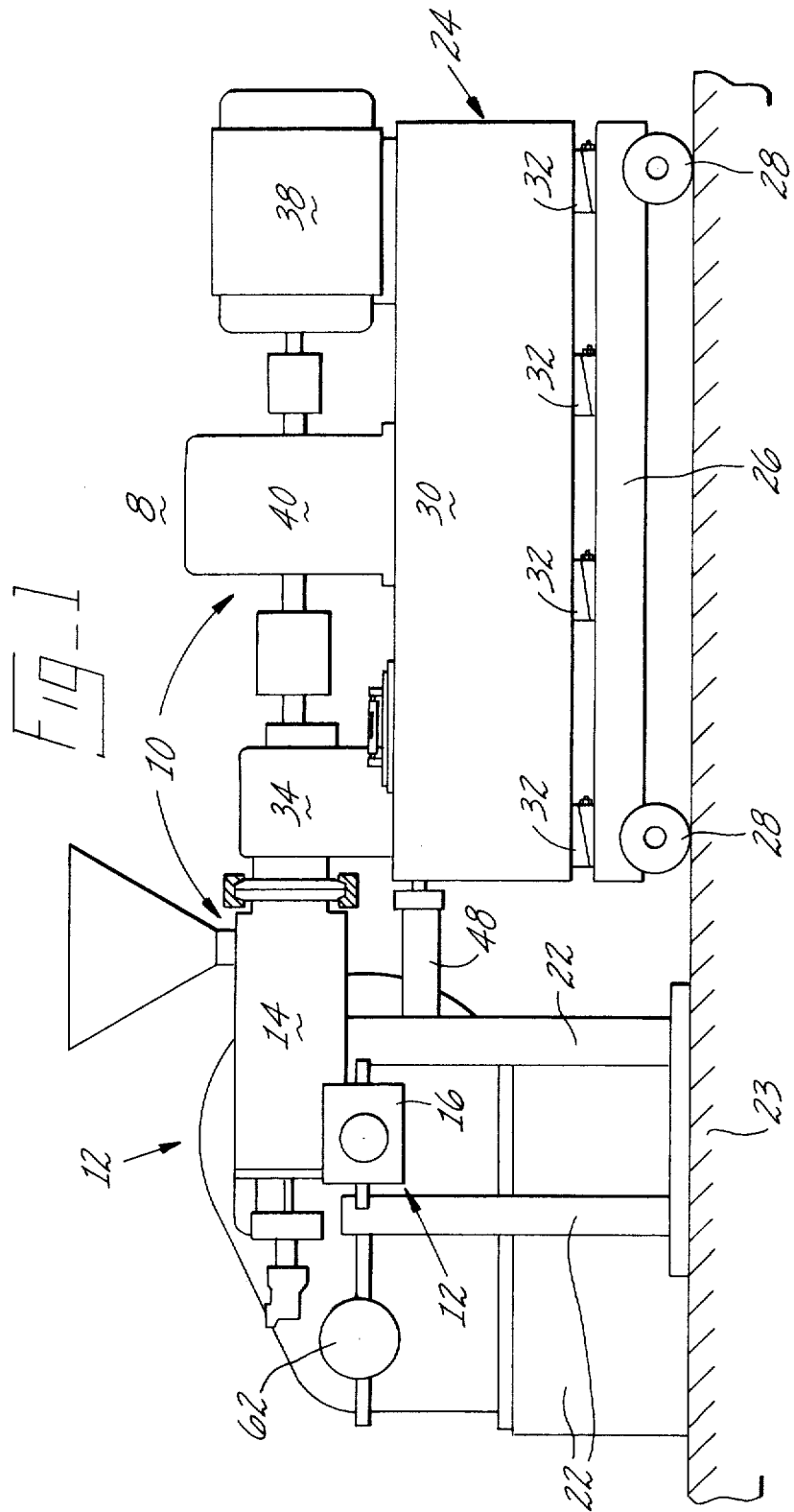
FIG. 1 is a diagrammatic view in front elevation of the illustrative mixing and venting extruder.

Referring to the drawings in detail, and particularly to FIG. 1, there is shown a mixing and venting extruder 8 which comprises a mixing portion 10 and an extruding portion 12. The extruder 8 comprises an integral barrel structure, 14 and 16, which can be regarded as being made up of a barrel 14 of the mixing portion 10 and a barrel 16 of the extruding portion 12. The barrel 14 comprises a bore 18, as shown in FIG. 3, having a cross section approximately in the form of a figure eight, the barrel 16 having a cylindrical bore 20. The barrel 16 runs generally from front to rear of the extruder 8 and the barrel 14 is disposed horizontally, at right angles to the barrel 16 with a left-hand end portion above a rear end portion of the barrel 16, as shown in FIG. 1. The barrel structure, 14 and 16, of the extruder 8 is supported by a frame 22.

Figure 2:
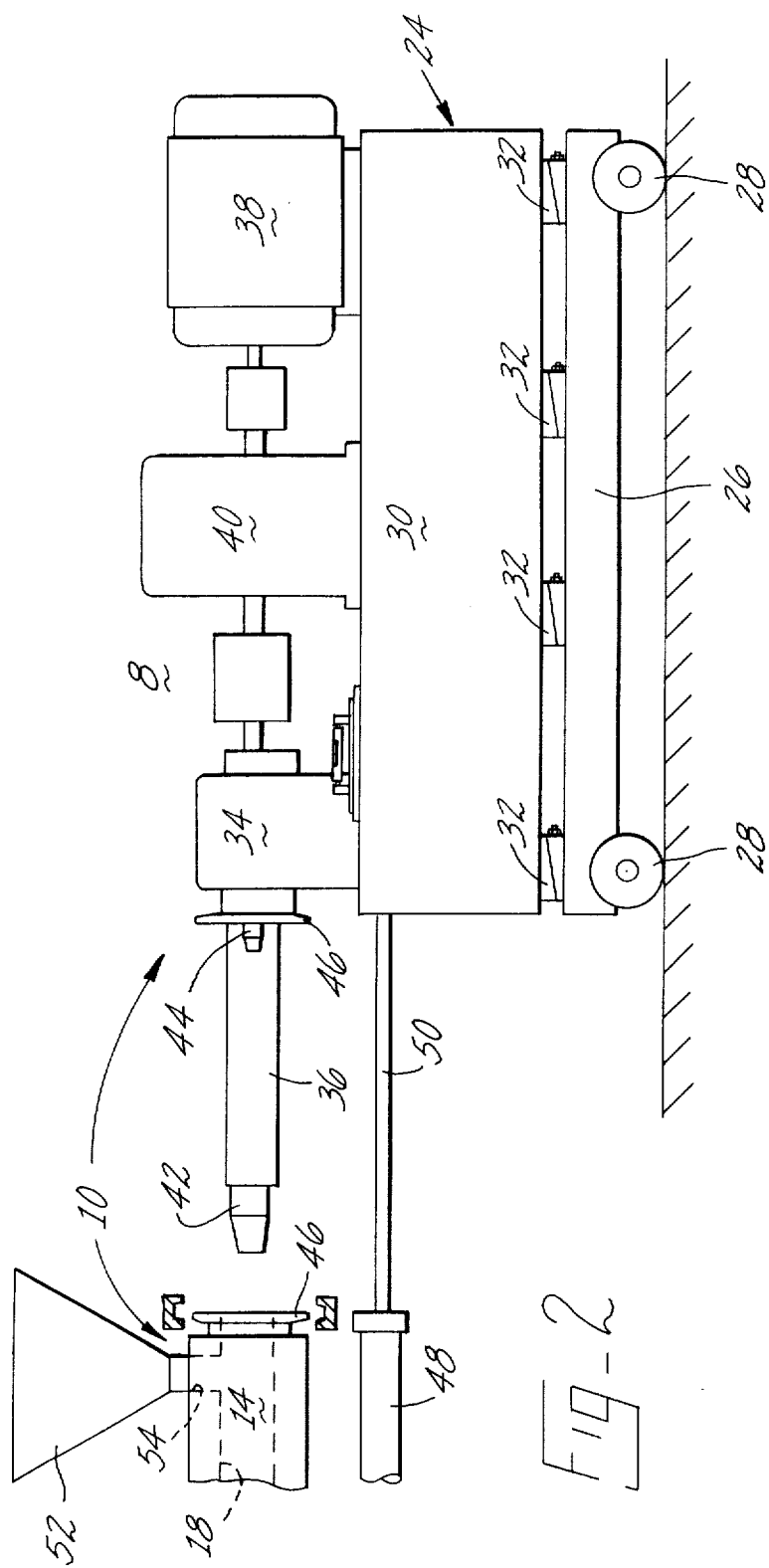
FIG. 2 is a diagrammatic view in front elevation showing a carriage of the illustrative extruder in a retracted position.

The mixing portion 10 of the extruder 8 also comprises a carriage 24. The carriage 24 comprises a base 26 on which are mounted rotatable wheels 28, the wheels being supported on and arranged to run along rails (not shown) fixed to a reinforced concrete base 23. The rails are so disposed as to be parallel with the bore 18. A support frame 30 of the carriage 24 is mounted on the base 26 by anti-vibration mounting means comprising anti-vibration mounts 32 each of which obeys Hooke's Law, approximately. A rotor support member 34 is upstanding from a left-hand portion of the support frame 30, as shown in FIGS. 1 and 2. A pair of parallel rotors 36 are supported for rotation in bearings (not shown) carried by the support member 34. The carriage 24 is so constructed and arranged that the rotors 36 are in alignment with the bore 18 of the barrel 14 of the mixing portion 10. The bore 18, having in cross section the approximate form of a figure eight, comprises two portions, each forming part of a cylinder joined by a connecting portion. The rotors 36 are received one in each of the part cylindrical portions of the bore 18 and, in the operation of the extruder 8, rotate in such a fashion that the volume swept by each rotor does not intercept the volume swept by the other rotor 36. The rotors 36 have a configuration generally similar to the rotors of an internal mixer, for example, a "Banbury" mixer. The rotors 36 are arranged to be driven in the operation of the extruder 8 by drive means comprising an electric motor 38 and a gear box 40, both mounted on the support frame 30 of the carriage 24.

The carriage 24 of the mixing portion 10 is movable, with the wheels 28 running along the rails (not shown), between an engaged position, as is shown in FIG. 1 and a retracted position, as shown in FIG. 2. When the carriage 24 is in the engaged position the rotors 36 are received in the bore 18 of the barrel 14 of the mixing portion 10 with a left-hand end portion 42 of each rotor received in an associated bearing (not shown) in a left-hand portion of the barrel 14. Spigots 44, only one shown in the drawings, project leftwardly from the support member 34 and are received in corresponding holes to locate the support member 34 in relation to the barrel 14 when the carriage is in the engaged position, as shown in FIG. 1. The support member 34 is clamped to the barrel 14 by means of a clamp ring which engages over lips 46 on the support member 34 and barrel 14.

The extruder 8 also comprises a cylinder 48 mounted on the frame 22 and a piston (not shown) slidable in the cylinder 48 and having a piston rod 50 connected to the carriage 24, for moving the carriage 24 along the rails toward and away from the barrel 14 between the engaged position and the retracted position. As the carriage 24 is moved by the movement of the piston rod 50 from the engaged position toward the retracted position the rotors 36 are withdrawn from the barrel 14 until the carriage 24 reaches the retracted position as shown in FIG. 2, in which the rotors 36 are completely clear of the barrel 14 permitting access to the bore 18 of the barrel and to the rotors 36, for cleaning and/or repair thereof.

The mixing portion of the mixing and venting extruder 8 further conprises a hopper 52 from which material can be supplied through an inlet 54 into a right-hand end portion of the bore 18. The barrel 14 has a passage 56 at a left-hand portion thereof, providing an outlet through a bottom surface of the barrel 14, the passage 56 opening into a rear end portion of the bore 20 of the extruding portion 12 of the extruder 8. A vent opening 58 is provided at a left-hand end portion of the barrel 14 opening upwardly from the barrel 14.

The extruding portion 12 of the mixing and venting extruder 8 comprises a rotor, namely an extrusion screw 60 mounted for rotation in the bore 20 of the barrel 16 of the extruding portion 12. The barrel 16 has an inlet provided by the passage 56 which forms the outlet from the bore 18 of the barrel 14 of the mixing portion 10 of the extruder 8. The extruding portion 12 of the extruder 8 comprises an outlet, not shown at a front end portion of the barrel 16. The outlet from the barrel 16 is in the form of a suitably shaped orifice, for example a slot type die for extrusion of film, or a pelletizing head where pellets would be formed.

The extruding portion 12 further comprises drive means 62 including a motor and gear box, for rotating the extrusion screw 60 in the bore 20. The drive means 62 is connected to a rearwardly extending drive shaft portion 61 of the extrusion screw 60.

The extruding portion 12 of the extruder further comprises a vacuum connection comprising a housing 64 in sealing engagement with the barrel structure, 14 and 16, about the rear of the bore 20 of the barrel 16. The threaded portion of the extrusion screw 60 projects rearwardly beyond the end of the bore 20 into the chamber defined by the housing 64. The extrusion screw 60 comprises a sealing portion 66 intermediate the threaded portion and the drive shaft portion 61 of the screw, the sealing portion rotating in a hole 68 in a rear plate of the housing 64. Sealing members, not shown, form a vacuum tight seal between the sealing portion 66 and the rear plate of the housing 64. A vacuum pipe 70 leads upwardly from the chamber of the housing 64 and can be connected by a suitable pipe arrangement to a suction device, not shown. A secondary outlet 72 leads from the chamber of the housing 64 for elimination of scrap material and the like. A door 74 normally seals the secondary outlet 72.

In the operation of the extruder 8 material to be extruded, for example pellets of plastics material, molten low density polythene supplied straight from the polythene forming reactor, or powdered rubber and an appropriate curing system, are supplied to the hopper 52 of the mixing portion 10. Where the extruder 8 is to be fed with a molten plastics material, the flow of plastics material from the reactor is not exposed to the air and may be supplied direct to the inlet 54 of the barrel 14. The carriage 24 is in the engaged position, as shown in FIG. 1. The rotors 36 are driven by the electric motor 38 through the gear box 40, the rotors subjecting material reaching the bore 18 of the barrel 14 through the inlet 54 from the hopper 52 to intensive working thus to thoroughly mix and homogenize the materials. Pellets of plastics material which are supplied to the hopper are melted in the mixing portion 10 and then thoroughly homogenized. The construction and arrangement of the barrel 14 and the rotors 36 is such that the rotors only exert a very small force on the material in the bore 18 tending to urge it leftwardly, as shown in FIG. 1, along the bore 18 from the inlet 54 towards the passage 56 providing the outlet from the mixing portion. In the steady state operation of the extruder 8 to extrude material, the extrusion screw 60 is rotated in such a direction as to urge material entering the bore 20 of the extruding portion 12 through the passage 56 from the mixing portion 10, forwardly, along the bore, from left to right as shown in FIG. 3. The material forced forwardly along the bore 20 is extruded through the primary outlet of the extruding portion 12 to provide the extruded product. The temperatures of the mixing portion 10 and the extruding portion 12 are controlled to maintain the material in the extruder in the appropriate condition.

The output of the extruder is controlled by the extruding portion 12, provided that the mixing portion 10 is kept supplied with an adequate quantity of raw materials through the hopper 52. As hereinbefore mentioned, the mixing portion is designed so that very little pressure is exerted on material in the bore 18 of the mixing portion. Thus material is withdrawn from the mixing portion 10 through the passage 56 by rotation of extrusion screw 60 as the material is required, there being little or no tendency for the mixing portion to force material through the passage 56 into the extruding portion 12; however, sufficient pressure is generated to ensure that the passage 56 is kept substantially filled.

The amount of work carried out on material by the mixing portion 10 is determined by the speed of rotation of the rotors 36 and by the temperature at which the material in the bore is maintained. For controlling the temperature of material in the bore 18, the temperature of the barrel 14 is controlled and means are provided for supplying a liquid cooling medium e.g. water to the barrel 14. For heating the barrel 14, thermocouples being provided to measure the temperature of the barrel and to effect control of the temperature. The temperature of the barrel 16 of the extruding portion 12 is likewise controlled and can be cooled by a liquid e.g. water cooling medium, or heated electrically.

In the operation of the extruder 8 a temperature differential may arise between the mixing portion 10 and the extruder portion 12. Such a temperature differential may cause expansion of, for example, the extruding portion so that the bore 18 is moved out of alignment with the rotors 36 of the mixing portion 10 by as much as 10 to 15 thousandths of an inch. The mounting of the support frame 30 for the rotor 36 on the anti-vibration mounts 32 allows the rotors to move slightly with the expansion of the extruding portion 12 without a substantial load being placed on the rotors. In the absence of the anti-vibration mounts a much greater load would be placed on the rotors and this would lead, in a relatively short time, to metal fatigue in the rotors leading to fatigue failure.

As the extruder operates to extrude material through the primary outlet from the bore 20 of the barrel 16 of the extruding portion 12, suction is applied through the vacuum pipe 70 to the chamber of the housing 64 at the rear of the bore 20. A vacuum of about 28 to 30 inches of Mercury may be applied through the pipe 70. Application of this vacuum to the chamber of the housing 64 removes gaseous matter from the material being processed by the extruder 8, the gaseous matter flowing rearwardly along the bore 20 from the region of the passage 56 along the screw flight into the chamber of the housing 64 through the vacuum pipe 70. The seal between the rear plate of the housing and the sealing portion 66 of the extrusion rotor, and the sealing outlet door 74 prevent air leaking into the chamber from the atmosphere. Presence of material being processed in the bore 18 of the mixing portion 10 and in the bore 20, in front of the passage 56, of the extruding portion 12 prevents air from the atmosphere being drawn through the bores 20 or 18. In addition to this vacuum venting, gaseous matter may leave the material being processed through the vent opening 58. If desired, a small amount of suction, for example a vacuum of three to four inches of water, may be applied to the vent opening 58, or the vent opening 58 may vent directly to the atmosphere. The vacuum venting provided by the vacuum connection is useful in removing free ethylene gas, where material processed is molten polyethylene fed to the extruder direct from the reactor which gas can be returned to the reactor. The vacuum venting is also useful for processing hygroscopic materials, for example acrylonitrile-butadiene-styrene copolymer, the vacuum venting removing water vapor. Vacuum venting may eliminate the need for a pre-drying stage in which hydroscopic materials are dried in a separate operation before they are fed to the mixing portion of the extruder.

When the extruder is to be started up from cold or is to be used to process different material or is started up from an empty condition, the material issuing from the mixing portion 10 through the passage 56 into the bore 20 will be inadequately mixed and homogenized because it will not have been subjected to sufficient intensive working. For example, where plastics material is supplied to feed hopper 52 in the form of solid pellets, the material issuing through the passage 56 may include some solid lumps of unmelted material. It is undesirable that this incompletely homogenized material should be extruded through the primary outlet from the extruding portion 12. The inhomogenieties are likely to block holes in a pellet plate or to form a blockage in part of a slot type die where such are being used, or where dies with a larger orifice are in use, the extrudate is likely to be nonuniform and thus of poor quality. One past practice has been to remove the actual die from the end of the extruding portion and to allow material to issue from the end of the barrel 16 of the extruding portion 12 freely until such time as the material issuing from the barrel 16 is of uniform quality, however this practice is troublesome and time-consuming.

During the initial starting up, the drive means 62 is caused to drive the extrusion screw 60 in a direction opposite that in which the extrusion screw 60 runs during its normal operation thus to drive material issuing into the bore 20 from the passage 56 rearwardly along the bore 20 into the chamber of the housing 64. The door 74 is, during starting up, in an open position thus opening the secondary outlet 72 from the bore 20 and allowing the inhomogeneous material from the mixing portion to issue from the outlet 72. This material can be collected and put back in the hopper 52. During the starting up, vacuum is not applied to the chamber of the housing 64. When the material issuing from the secondary outlet 72 is of uniform and acceptable quality, the door 74 is closed to seal the chamber of the housing 64 and the drive means 62 is caused to rotate the extrusion screw in a direction to drive material along the bore 20 forwardly towards the primary outlet from the bore 20. At the same time a vacuum is applied to the chamber of the housing 64. Rotation of the screw 60 to drive the material in the bore 20 forwardly removes much of the material from the chamber of the housing 64, a small plug of material may remain in the secondary outlet 72, which plug may be removed at a later stage. The use of a secondary outlet in this manner is convenient and avoids the troublesome removal of the extrusion dies from the front end of the extruding portion which has hitherto been a known practice.

When it is desired to gain access to the bore 18 of the barrel 14 of the mixing portion 10 or to the rotors 36, the extruder 8 is first emptied of material, so far as possible, by stopping feed to the hopper 52 and allowing the extruding portion 12 and the mixing portion 10 to operate until no extrudate issues from the primary outlet of the extruding portion 12. The drive means 62 of the extruding portion 12 and the motor 38 of the mixing portion 10 are stopped. The clamp ring is removed from the lips 46 on the barrel 14 and on the rotor support member 34. The piston and cylinder device is then operated by admitting oil under pressure to the cylinder 48 to move the piston rod 50 out of the cylinder 48 to thus move the carriage 24 to the right, viewing FIG. 1, to its retracted position in which it is shown in FIG. 2. Previous machines have comprised a mixing portion and an extruding portion in which the barrel of the mixing portion is spaced from the barrel of the extruding portion and access to the interior of the barrel and to the rotors has been obtained by removing the barrel from the rotors, the rotors and drive therefor being fixed. As hereinbefore mentioned, it is necessary to supply cooling fluid and heating means to the barrel as well as thermocouples with their necessary connecting wires. Past machines have had to have flexible connectors for all these services, or alternatively the services have had to be disconnected. A large number of connections were involved and it was both time consuming and inconvenient to remove the barrel. In the case of the present invention, the moving of the carriage to withdraw the rotors 36 from the barrel 14 necessitates only the use of a flexible electrical supply wire to the electric motor, or alternatively, a readily disconnectable electric supply to the motor 38. However there is only a single connection involved and the problem is therefore much simpler than in the case of the previous machines. Furthermore, the use of spaced apart barrels for the mixing portion and extruding portion of known machines demanded that the barrels of both the mixing portion and the extruding portion be sufficiently rigid in their own right to withstand the stresses generated during operation of the machine. The integral barrel structure used means that the barrel 16 of the extruding portion gains in rigidity from the fact that it is fixed to the barrel 14 of the mixing portion 10 and vice versa, the necessary rigidity being thereby achieved with the use of less metal. This integral barrel structure means that the bores of the barrel of the mixing portion can be positioned closer to the bore of the barrel of the extruding portion than was possible in the known machines thus leading to a shorter connecting passage between the bores of the two barrels than has been possible in known extruding machines. This shorter connecting passage has a much lower resistance to flow therethrough than was the case in the known machines and leads to better flow control of material through the extruder than was readily achievable in the known extruding machines.

Although the opening 58 of the illustrative extruder is primarily intended as a vent opening, it may also be used to feed additional materials to the extruder. For example, in making glass fiber reinforced plastics extruded sections, it is necessary to subject the plastics material to intensive working but, on the other hand, intensive working tends to break up the glass fibers into undesirably small lengths. Accordingly, it is desirable to feed the glass fibers into the plastics material at a stage of operation after the plastics material has already undergone the majority of its intensive working and this can be achieved by supplying the glass fiber to the extruder through the opening 58. Openings may be provided in the barrel 14 of the mixing portion 10 or in the barrel 16 of the extruding portion 12 at other positions for supply of additives or for venting purposes, if desired. However care must be taken to avoid so-called "vent plugging" which can lead to poor quality extruded material.

Though this invention has been described with some degree of particularity, it is intended to be exemplary only, and not interpreted in a limiting sense.

We claim:

1. A screw extruding machine for homogeneously mixing and extruding a thermoplastic material, said machine comprising:
    a feed hopper for feeding thermoplastic material to said machine;
    at least one rotor disposed in a mixing bore of said machine for mixing said thermoplastic material fed to said machine;
    an extruding screw disposed in an extruding bore of said machine, said extruding bore being in communication with said mixing bore;
    a sealable vacuum chamber disposed about the rearward end of said extruding screw;
    a vacuum pipe attached to said vacuum chamber permitting gaseous evacuation of said material during machine operation;
    a scrap outlet disposed included with said sealable vacuum chamber; and
    means for reversing said extruding screw to cause undesirable material from being extruded through said screw bore, said undesirable material being disposable through said outlet disposed within said vacuum chamber.

2. A screw extruding machine for homogeneously mixing and extruding a thermoplastic material as recited in claim 1, wherein said extruding bore comprises a passageway for extraction of gases from said thermoplastic material, during operation of said machine.

3. A screw extruding machine for homogeneously mixing and extruding a thermoplastic material as recited in claim 1, wherein said rotor is rotatably mounted on a carriage, said carriage being movable toward and away from said mixing bore to displace said rotor from said bore to facilitate repair and cleaning of said machine.

4. A screw extruding machine for homogeneously mixing and extruding a thermoplastic material as recited in claim 3, wherein said carriage is mounted on anti-vibration mounts to prevent excessive stress on said mixing rotor in said mixing bore of said machine.

* * * * *